United States Patent [19]
Zonkoski et al.

[11] Patent Number: 5,659,289
[45] Date of Patent: Aug. 19, 1997

[54] CONTROL AND INTERFACE SYSTEM FOR EMERGENCY VEHICLES

[76] Inventors: John A. Zonkoski, 1450 Oak Tree Ct., La Habra, Calif. 90631; Dennis W. Hradisky, 13133 Falcon Pl., Chino, Calif. 91710

[21] Appl. No.: 517,134

[22] Filed: Aug. 21, 1995

[51] Int. Cl.$^6$ ................................................ B60Q 1/00
[52] U.S. Cl. .................. 340/438; 340/463; 340/467; 340/468; 340/471; 340/472; 340/473
[58] Field of Search .................... 340/438, 467, 340/439, 456, 468, 479, 463, 471, 472, 425.5, 473, 585, 584; 307/10.8, 10.7; 348/148, 149; 320/13, 40; 211/8, 64; 224/275, 42.45 R, 42.42, 913

[56] References Cited

U.S. PATENT DOCUMENTS

| | | | |
|---|---|---|---|
| 3,882,452 | 5/1975 | Stevens | 340/467 |
| 4,195,288 | 3/1980 | Morton | 340/539 |
| 4,265,603 | 5/1981 | Chiyoda et al. | 340/585 |
| 4,579,263 | 4/1986 | Elmke et al. | 224/42.42 |
| 4,747,280 | 5/1988 | Shaw | 211/64 |
| 4,878,042 | 10/1989 | Eggiman et al. | 340/467 |
| 4,902,956 | 2/1990 | Sloan | 307/10.7 |
| 5,012,606 | 5/1991 | McNulty et al. | 42/70.11 |
| 5,129,563 | 7/1992 | Dillon | 224/275 |
| 5,160,874 | 11/1992 | Lyons et al. | 340/471 |
| 5,434,553 | 7/1995 | Rhodes | 340/468 |
| 5,491,464 | 2/1996 | Carter et al. | 340/425.5 |

*Primary Examiner*—Thomas Mullen
*Assistant Examiner*—Edward Lefkowitz
*Attorney, Agent, or Firm*—Roy A. Ekstrand

[57] ABSTRACT

An interface system for use in a motor vehicle to be converted to a police or emergency vehicle includes a switch panel array operating an array of relays which in turn controls a lamp unit such as a conventional light bar. A video camera and VCR are mutually coupled to a VCR control which in turn responds to a control logic to provide automatic operation of the VCR during events. A canine alert system includes temperature sensing and engine electrical system sensing and responds to an air conditioning failure or engine stall condition to produce a transmitted alert signal using a pager or beeper or the like. A power management system monitors the operating supply voltage of the vehicle and sequentially shuts down the emergency light apparatus as the battery voltage decreases. A back-up light and brake light kill responds to a panel control switch for interrupting the activity of brake lights and back-up lights.

12 Claims, 2 Drawing Sheets

CONTROL AND INTERFACE SYSTEM FOR EMERGENCY VEHICLES

FIELD OF THE INVENTION

This invention relates generally to police and emergency vehicles and particularly to the control systems used therein.

BACKGROUND OF THE INVENTION

Police vehicles have become a familiar sight to virtually all people throughout the United States and other industrialized nations. Police cars in particular have become extremely familiar and visible as they patrol various areas throughout the country. In addition to the typical police car, other agencies having somewhat similar functions and needs often maintain police car type vehicles in a patrol function. Other emergency vehicles such as firefighting vehicles and equipment as well as ambulances utilize many similar systems to those employed in typical police cars. In recent years, a number of developing technologies have been employed in police-type vehicles which have greatly increased the complexity and sophistication of these familiar vehicles. The systems have evolved from the simple roof mounted flashing light and siren configurations of years past into complex, often computer equipped multifunction type systems. While the appearances and equipment utilized in such patrol vehicles varies substantially between different police agencies and other users, all generally employ an equipment set which includes an elongated light bar secured to the vehicle roof and supporting a plurality of flashing and rotating light apparatus. Such vehicles continue to utilize sirens as well as external high powered speakers for communication with persons outside the car and additional lights placed at the front end rear of the vehicle including sets of red and amber lights. In addition, the conventional vehicle lights themselves such as headlights and taillights are often tied into the emergency systems. Many such police cars utilize computer apparatus and data link equipment to further enhance the information available to the police officer. The emergency equipment set also includes a radio for communication and mechanical configurations and barriers within the vehicle for physically securing occupants in the rear portion of the vehicle. Many police are equipped with a shotgun or similar weapon which is secured within the front seat area of the vehicle by a gun lock apparatus. The latter maintains the security of the gun until needed. In recent years, a growing trend in police car equipment has been the addition of video camera and video recording equipment intended to be operated during events and occurrences.

In practice, police agencies and other similar agencies produce patrol cars by converting more or less standard automobiles to patrol cars in a process best described as custom installation of the emergency and police equipment. This process has proven to be time consuming and costly. In addition, the creation of custom installations for each patrol car renders the maintenance process more costly and difficult thereby increasing operating costs of the police department or agency.

In the typical use of a police or patrol car, the officer or officers spend extensive periods of time moving about in a patrol or observation function and periodically increasing the intensity of activity in various events such as pursuit or responding to different types of calls and situations. In many police agencies, patrol cars are operated by a single police officer relying extensively upon backup from other nearby officers as they respond to a pursuit or other event. The operation of patrol cars with a single police officer results in a situation in which the patrol vehicle is likely to be left unattended as the officer moves from the vehicle to respond to the situation or event. It is not unusual for police officers to encounter a need to leave the vehicle unattended during times when passengers in custody are being confined within the rear seat security area. Also, canine units which regularly utilize police dogs often need to leave the police dog within the vehicle interior while conducting activities external to the vehicle. In addition, notwithstanding passengers or police dogs being left within the vehicle interior, police officers frequently leave the vehicle with the various emergency lights flashing to provide warning to other drivers in the area of the need for caution. Unfortunately, a malfunction of the air conditioning system or an engine stall under such circumstances can have disastrous consequences. In hot weather, passengers or police dogs trapped within a malfunctioning vehicle may be subjected to extreme and potentially hazardous heat. Even without passengers or police dogs in the vehicle, an engine stall of an unattended police vehicle causes a substantial power drain upon the vehicle battery system when the emergency lights are operating. Sufficient battery drain may leave the vehicle unable to restart putting the vehicle out of service.

Thus, while police departments and other agencies continue to require such patrol vehicles or other similarly equipped vehicles, substantial problems arise in the cost of conversion, the maintenance of converted vehicles and the safe operation of such vehicles in their use. There remains therefore a need in the art for an improved control and interface system for emergency vehicles which renders installation and customization as well as maintenance more cost effective in such vehicles while providing a maximum level of security and safety for vehicle occupants during their use in the field.

SUMMARY OF THE INVENTION

Accordingly, it is a general object of the present invention to provide an improved control and interface system for emergency vehicles. It is a more particular object of the present invention to provide an improved control and interface system for emergency vehicles which reduces the cost and labor associated with the conversion of a conventional automobile to a patrol vehicle. It is a still more particular object of the present invention to provide an improved control and interface system for emergency vehicles which provides additional safety for passengers and other occupants of the vehicle and its operation in an unattended state.

In accordance with the present invention, there is provided for use in a motor vehicle having an ignition switch, a plurality of supplemental lights for use by police or emergency personnel and a source of vehicle electrical power source, a control and interface system comprising: a switch array having a plurality of user-operable switches; a plurality of relays each coupling selected groups of the supplemental lights to the source of vehicle electrical power; and power management means for detecting the decrease of output voltage of the source of vehicle electrical power and sequentially terminating the coupling of the selected ones of the relays at sequentially lower output voltages.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
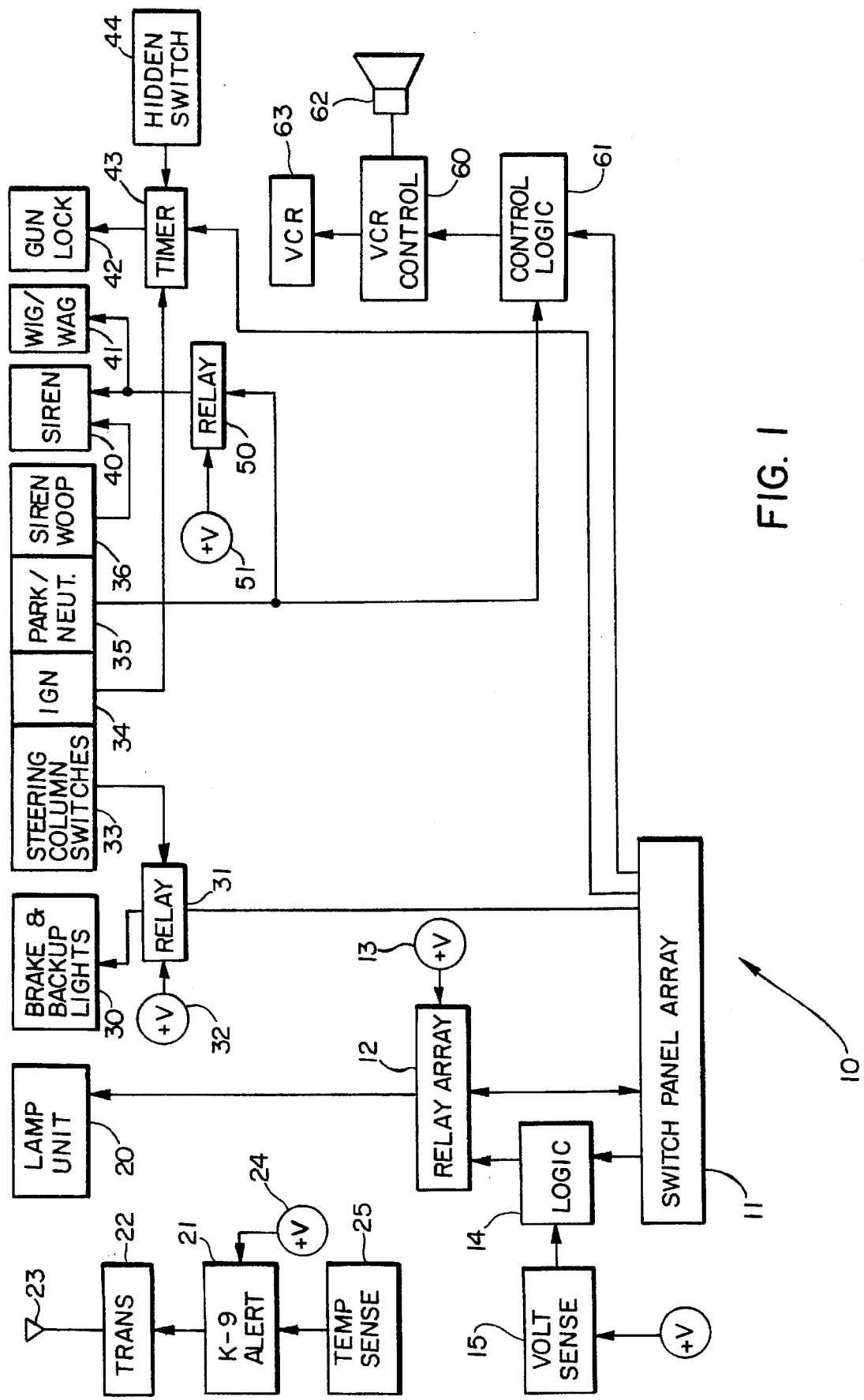
FIG. 1 sets forth a block diagram of the present invention control and interface system for emergency vehicles.

FIG. 1 sets forth a block diagram of a control and interface system constructed in accordance with the present invention and generally referenced by numeral 10. System 10 is operative in a conventional automobile environment of the type which is typically converted to a police or emergency vehicle. Thus, it will be understood that in the embodiment shown in FIG. 1, a conventional supply of electrical power is available from the conventional battery and alternator recharging system used to operate a motor vehicle. Additionally, however, it should also be understood that the operative power system of the host vehicle may be enhanced to provide greater electrical power capability for use in operating the various electrical systems within the converted vehicle. Thus, in accordance with conventional fabrication techniques, the host vehicle within which the present invention system is installed should be understood to include a plurality of steering column switches 33 together with conventional ignition switch connections 34, a park/neutral switch connection 35 and brake and back-up light connections 30. A siren-woop switch 36 is also installed in common with switches 33, 34 and 35.

To provide conversion of the host vehicle, a switch panel array 11 having a plurality of user operable switches described below in greater detail is installed within the interior of the vehicle. A lamp unit or light bar unit 20 is secured to the vehicle roof and is operatively coupled to switch panel array 11 via a relay array 12. Relay array 12 is described below in greater detail and includes a plurality of operative relays responsive to the individual switches of switch panel array 11 to provide coupling of operative power from voltage source 13 to lamp unit 20. In addition, switch panel array 11 is further coupled to relay array 12 through a logic circuit 14. Logic circuit 14 is described below in greater detail and provides selective coupling between switch panel array 11 and relay array 12 to provide conditional operation of certain ones of the relays within array 12. A voltage level sensor 15 controls logic array 14 and is responsive to the voltage of operative power source 16. The operation of voltage sensor 15 is described below in greater detail. However, suffice it to note here that voltage sensor 15 responds to the operative voltage of the vehicle supply indicated as voltage source 16. Switch panel array 11 is further coupled to brake and back-up light switches 30 by a secondary relay 31. Relay 31 operatively couples power from voltage source 32 to back-up and brake lights system 30 in response to the condition of switch panel array 11. In addition, certain ones of the steering column switches within switch unit 33 are also coupled to and operate relay 31 in the manner described below.

In addition to the installation of lamp unit or light bar 20 and relay array 12 and switch panel array 11, the installation of system 10 within the host vehicle may further include a warning system referred to as canine alert which includes a canine alert sensor 21 coupled to operating power source 24 of the host vehicle. Canine alert sensor 21 is coupled to a temperature sensor 25 and a radio transmitter 22 which in turn supports a transmitting antenna 23.

A gun lock unit 42 is installed within the interior of the host vehicle and includes a mechanical receptacle and locking apparatus constructed in accordance with conventional fabrication techniques for receiving and securing a larger weapon such as a shotgun or the like. A timer 34 within the present invention system is operatively coupled to and controls the actuation of gun lock 42. Timer 43 is further coupled to a hidden gun lock switch 44 typically installed within the host vehicle interior at some accessible but unrecognizable place. Switch array 11 is also coupled to timer 43 along with ignition switch 34. Thus, by means set forth below in greater detail, gun lock 42 is actuated in response to the condition of ignition switch system 34, hidden switch 44 and switch panel array 11 to make the secured weapon releasible or available for the time interval during which timer 43 operates. Under all other conditions, gun lock 42 remains locked reliably securing the weapon retained within the gun lock.

A relay 50 is operatively coupled to a siren 40 and a wig/wag signal system 41. Relay 50 is further coupled to park/neutral switch system 35 and a source of operating power 51.

A video camera 62 and video cassette recorder (VCR) 63 are coupled to a VCR control 60 which in turn is operative in response to a control logic 61. Logic 61 is coupled to switch panel array 11 and park/neutral switching system 35. The operation of VCR control 60 together with VCR 63 and video camera 62 is described below in greater detail. However, suffice it to note here that camera 62 and VCR control 60 are operative in response to control logic 61 to provide automatic recording within VCR 63 of the output of camera 62 during the occurrence of events without the need for activation by the police officer. In this way, the police officer in initiating an event is relieved of the additional task of operating the taping of the event within VCR 63.

In operation under normal patrol conditions as the police officer cruises or conducts routine observations, the host vehicle and the present invention system operate in a normal or nonevent mode. Under such conditions, the various switches within switch panel array 11 are in their deactivate state and lamp unit 20 is inoperative. In addition, relay 31 operates to maintain normal activity of brake and back-up light system 30 as well as ignition switching system 34, park/neutral switching system 35 and steering column switches 33. The absence of event indication maintains VCR 63 inoperative and maintains the closure of gun lock 42. In addition, siren-woop 36, siren 40 and wig/wag 41 are similarly inoperative.

Upon the initiation of an event in which the police officer commences activities beyond normal patrolling, a selected one or plurality of switches within switch panel array 11 is actuated. In accordance with conventional or typical police operation, the present invention system operates in three basic event modes characterized by the degree to which the light control systems of the vehicle are operated. In event mode one, amber lights within lamp unit 20 and possibly others situated about the vehicle are flashed producing the amber flashing mode. In the second event mode, the red lights within lamp unit 20 and otherwise situated about the vehicle are similarly flashed producing the red flashing mode. In the final event mode, the entire light system of the vehicle and lamp unit 20 is operative to produce flashing of all lights as well as the activation of rotating lights referred to in the art generally as rotators. The police officer operating the vehicle initiates an event by selecting the event mode using switch panel 11 and producing the desired light operation. Once the officer initiates an event by switching one or more appropriate switches within panel array 11, system 10 responds to the commencement of an event. In response to the switching within panel array 11, relay array 12 couples operative power from source 13 to lamp unit 20 activating the desired light system operation. In addition, logic 14 responds to the condition of voltage source 16 as detected by sensor 15 to further actuate relays within array 12 in the manner set forth below supplementing the control of light unit 20.

As an event commences, control logic 61 responds to the output of switch panel array 11 and configures VCR control 60 to operate VCR 63 and record the output of video camera 62. As is set forth below in greater detail, control logic 61 and VCR control 60 cooperate in response to switch panel array 11 and park/neutral switch system 35 to assure that once an event is initiated, VCR 63 continues to record until the event is concluded. In the preferred configuration of the present invention system, the conclusion of an event once initiated is interpreted in response to the output of park/neutral switch system 35 indicating the vehicle is not in neither park nor neutral and the absence of operation of the light system in any one of the three event modes. Thus, VCR 63 continues to record once activated until the police has concluded the event by turning off the light system and moving the vehicle into drive or reverse and driving away. At that point, logic 61 interprets the condition as nonevent and terminates the operation of VCR 63.

Logic 14 and voltage sensing unit 15 cooperate to monitor the voltage level of the vehicle operating power source 16. The function of logic 14 and voltage sensor 15 is to provide an important aspect of the present invention system referred to as the power management system. As long as the host vehicle is being driven and attended to by the police officer, the voltage level of vehicle power source 16 remains within its normal range and logic 14 is configured in its normal state. In the event the host vehicle is left unattended by the police officer, the operation of the power management system becomes important. For example in the event the police officer having initiated an event mode of the type described above leaves the vehicle unattended, the power management system monitors the operating voltage condition of the vehicle power system to avoid undue discharging of the vehicle battery. So long as the vehicle engine continues to run, the vehicle charging system will of course maintain the proper charge condition on the battery. However, in the event the officer leaves the vehicle with lights on and with the engine turned off or in the event the engine dies in the officer absence, the entire light system is operating solely upon power provided by the vehicle battery. In such case, the power management system by means set forth below in greater detail continuously monitors the voltage level of the vehicle battery system and through the operation of logic 14 begins shutting down vehicle lighting systems to conserve power as the vehicle battery becomes discharged. In the preferred operation of the power management system, logic 14 initially shuts down the rotators within lamp unit 20 in the first phase of power conservation as the output level of vehicle battery source 16 begins dropping. Once the vehicle battery power drops further, logic 14 then terminates the operation of red flashing lights within lamp unit 20. Finally, at the lowest permitted voltage level of the vehicle battery system, the power management system terminates the operation of amber lights within lamp unit 20. In this way, the operating power of the unattended vehicle is protected against inadvertent power drain and the resulting battery discharge when left unattended.

In accordance with an additional important aspect of the present invention system, the above-described problem of protecting passengers or police dogs secured within an unattended vehicle is addressed by the combination of canine alert system 21, transmitter 22 and temperature sensor 25. In the typical operative scenario, the police officer having a passenger in custody or a police dog secured within the rear portion of the police vehicle is required to exit the vehicle and pursue additional activity relying upon the security of the vehicle to maintain the passenger in custody or police dog. In warm weather situations, the officer will leave the vehicle engine and air conditioning system operating and leave the vehicle. Once leaving the vehicle, the officer may need to move a substantial distance from the vehicle and typically will lose sight of the vehicle. Fully occupied with the events at hand, the officer cannot be concerned about the continued operation of the vehicle. A substantial hazard arises however for the vehicle occupant or police dog in the event the engine dies or the air conditioning system malfunctions. Persons or animals trapped within closed vehicles in warm weather climates can easily be seriously injured or may die if unattended. To meet this need, the present invention system utilizes a canine alert unit 21 described below in greater detail which monitors the air conditioning system operation via a temperature sensor 25 and the engine operative condition using the voltage level of the vehicle power system 24. So long as temperature sensor 25 indicates proper operation of the vehicle air conditioning system and so long as the voltage level of the electrical system of the vehicle is above the charging rate indicating the alternator is operating, canine alert system 21 remains inactive. In the event the voltage of system 24 falls, indicating an engine stall, or temperature sensor 25 indicates a prohibitively rising temperature indicating air conditioning system failure, canine alert system 21 responds by activating a beeper transmitter 22 which transmits an alert beeping signal to a beeper carried by the officer. A variety of conventional beeping systems may be utilized for transmitter 22 and the responding unit of the officer such as conventional pagers or the like. The essential feature is the communication of the canine alert signal condition to the officer bringing the police officer back to the unattended car in time to avert injury to the vehicle occupants.

Brake and back-up light system 30 is constructed in accordance with conventional fabrication techniques typical of motor vehicles and provides operation of back-up lights when the vehicle is placed in reverse gear and operation of brake lights when the driver depresses the brake pedal. In many situations encountered by police officers, however, it may be desirable to suspend the operation of brake and back-up lights to avoid unduly signalling the position of the police officer's car. To provide this capability, relay 31 is operated in response to a switch unit within switch panel array 11 to interrupt the operating power to the brake and back-up light systems.

Figure 2:
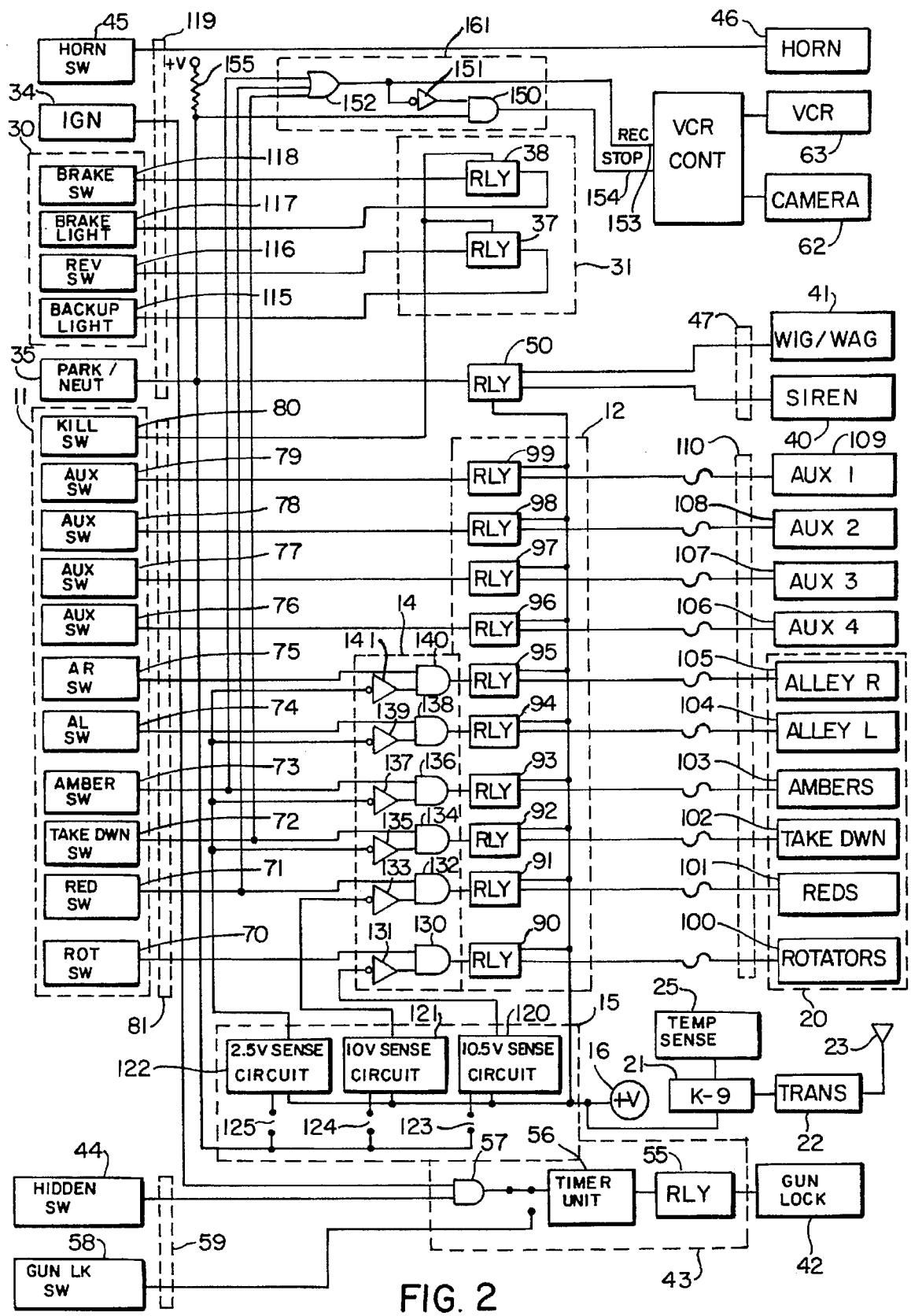
FIG. 2 sets forth a more detailed block diagram of the present invention control and interface system for emergency vehicles.

FIG. 2 sets forth a more detailed block diagram of the present invention control and interface system. As described above, the present invention control and interface system includes a switch panel array 11 shown in dashed outline having a rotator switch 70, a red light switch 71, a take down switch 72, an amber light switch 73, an alley light left switch 74 and an alley light right switch 75. For further expansion and customization of the present invention system, switch panel array 11 further includes a plurality of auxiliary switches 76 through 79 together with a brake light and back-up light kill switch 80. As is also mentioned above, the present invention system includes a relay array shown in dashed-line box 12 which includes a plurality of relays 90 through 95 corresponding to switch panel switches 70 through 75 respectively. In further correspondence to switch panel 11, relay array 12 further includes auxiliary relays 96 through 99. Relays 90 through 99 are commonly coupled to a source of vehicle operating supply voltage 16. It should be understood by those skilled in the art that supply voltage 16 in the preferred form of the present invention system comprises the electrical twelve volt supply of the host vehicle. It may however, if preferred, comprise an enhanced electrical power system within the vehicle. With temporary reference to FIG. 1, it will be recalled that FIG. 1 for convenience shows a plurality of electrical power supplies 13, 16, 24, 32 and 51. The separate supplies shown in FIG. 1 is merely a matter of drawing convenience. It will be understood by those skilled in the art that operating supply sources 13, 16, 24, 32 and 51 are all couplings to the vehicle power supply. Returning to FIG. 2, each of relays 90 through 95 has an output connection coupled to a respective light unit within lamp unit 20 shown in dashed outline. Thus, lamp unit 20 includes a plurality of light rotators 100 coupled to the output of relay 90, a plurality of flashable red lights 101 coupled to the output of relay 91, a plurality of take down lights 102 coupled to the output of relay 92, a plurality of amber lights 103 coupled to relay 93, a plurality of left side alley lights 104 coupled to the output of relay 94, and a plurality of right side alley lights 105 coupled to the output of relay 95. A plurality of auxiliary units 106 through 109 are shown coupled to the outputs of relays 96 through 99 respectively. A logic array 14 shown in dashed outline is interposed between switch panel array 11 and relay array 12. Logic array 14 includes a plurality of gate combinations for controlling the respective operations of each of relays 90 through 95. More specifically, array 14 includes an AND gate 130 having an output coupled to the trigger input of relay 90 and having a first input coupled to rotator switch 70. AND gate 130 further includes an inverter 131 coupled to the remaining input. Similarly, logic array 14 includes an AND gate 132 having an output coupled to the trigger input of relay 91 and an input coupled to red light switch 71. An inverter 133 is coupled to the remaining input of AND gate 132. Array 14 further includes an AND gate 134 having an output coupled to the trigger input of relay 92 and an input coupled to take down switch 77. An inverter 135 is coupled to the remaining input of AND gate 134. An AND gate 136 includes an output coupled to the trigger input of relay 93 and an input coupled to amber light switch 73. An inverter 137 is coupled to the remaining input of AND gate 136. An AND gate 138 includes an output coupled to the trigger input of relay 94 and an input coupled to alley left switch 74. An inverter 139 is coupled to the remaining input of AND gate 138. Logic array 14 further includes an AND gate 140 having an output coupled to the trigger input of relay 95 and an input coupled to alley right switch 75. An inverter 141 is coupled to the remaining input of AND gate 140.

The present invention system further includes a voltage sensing system shown in dashed-line representation 15 having a plurality of voltage sensors 120, 121 and 122. Sensors 120, 121 and 122 are commonly coupled to vehicle operating supply voltage source 16 and perform a voltage measurement function in which an output signal is produced in the event the sensed supply voltage of the vehicle drops beneath a predetermined voltage level. While the threshold voltage levels of sensors 120 through 122 may be selected in accordance with system characteristics and design preference, it has been found convenient to establish sensor 120 at ten and one half volts, sensor 121 at ten volts and sensor 122 at nine and one-half volts. Thus, sensors 120, 121 and 122 produce output signals whenever vehicle power source 16 drops beneath their respective threshold voltages. Voltage sensors 120 and 121 are coupled to the inputs of inverters 131 and 133 respectively. The output of sensor 122 is commonly coupled to the input of inverters 135, 137, 139 and 141. A plurality of jumper connections 123, 124 and 125 are coupled to sensors 120, 121 and 122 respectively. Jumpers 123 through 125 are commonly coupled to a park/neutral switch 35. A gun lock timer 43 shown in dashed outline includes a timer unit 56 having an output coupled to a relay 55. Timer 43 further includes an AND gate 57 having an output coupled to the reset input of trigger 56. The remaining input of AND gate 57 is coupled to a hidden switch 44 which typically is placed within the vehicle interior. A gun lock switch 58 also typically placed within the vehicle interior is coupled to the reset input of timer 56. A gun lock receptacle 42 having means for receiving and lockably securing a shotgun or the like is coupled to relay 55 and is typically supported within the interior of the host vehicle.

Park/neutral switch 35 is coupled to the trigger input of a relay 50 which in turn is coupled to operating supply 16. Relay 50 is a double throw relay having outputs coupled to a wig/wag unit 41 and a siren 40. A brake and back-up light switch system shown in dashed-line representation 30 includes a plurality of back-up lights 115, a reverse switch 116, a plurality of brake lights 117 and a brake light switch 118. A relay set 31 shown in dashed-line representation includes a pair of relays 37 and 38 having outputs coupled to back-up lights 115 and brake lights 117 respectively. Relays 37 and 38 are further coupled to reverse switch 116 and brake switch 118. The trigger or control inputs of relays 37 and 38 are commonly coupled to a kill switch 80. A horn switch 45 is coupled to a horn 46.

The present invention system further includes a VCR control logic shown by dashed-line representation 61 together with a VCR control unit 60, a VCR 63 and a video camera 62. VCR 63 and video camera 62 are each coupled to VCR control 60. VCR control 60 includes a record signal input 153 and a stop signal input 154. Thus, in response to a record signal at input 153, VCR control 60 causes the output of video camera 62 to be recorded within VCR 63. Conversely, upon the application of a stop signal at input 154, VCR control 60 terminates the recording action of VCR 63. Control logic 61 provides the record and stop signal inputs to VCR control 60 in response to the occurrence of an event. Control logic 61 utilizes the outputs of red light switch 71, take down switch 72 and amber switch 73 to sense the initiation of an event. Within control logic 61, switches 71, 72 and 73 are coupled to a three input OR gate 152. The output of OR gate 152 is coupled to record input 153 of VCR control 60. In addition, an AND gate 150 within control logic 61 has one input coupled to park/neutral switch 35 and to supply 16 by a resistor 155. The remaining input is coupled to an inverter 151, the input of which is coupled to the output of OR gate 152. The output of AND gate 150 is coupled to stop input 154 of VCR control 60.

In operation, during normal patrol or cruise operations, switches 70 through 80 are not activated and, as a result, relays 90 through 99 are inoperative. Accordingly, light units 100 through 105 of lamp unit 20 as well as auxiliary apparatus 106 through 109 remain inoperative. Also during this time, the absence of an event provides that the inputs to OR gate 152 of control logic 61 remain low and, as a result, VCR control 60 maintains VCR 63 in an off condition. Further, under normal patrol conditions with kill switch 80 inactive, relays 37 and 38 remain closed providing coupling between reverse switch 116 and back-up lights 115 and between brake light switch 118 and brake lights 117. As a result, the host vehicle is operative in a normal manner and the emergency and specialized equipment within the system is largely inactive.

Upon the occurrence of an event initiated by the officer's activation of any of switches 71, 72 or 73 which it should be recalled constitute the three event modes of the system, the present invention system responds to an event. Thus, for example, in the event the officer initiates an event by activating red light switch 71 of switch panel array 11, an output signal is provided to OR gate 152 causing its output to go high. A high output signal from OR gate 152 is received at input 153 of controller 60 causing VCR 63 to begin recording. Simultaneous to the initiation of VCR recording, the activate signal from switch 71 is applied to one input of AND gate 132. The remaining input of AND gate 132 is coupled to inverter 133. Assuming for the moment that the electrical system of the vehicle is operating properly, the output voltage at voltage source 116 maintains all three voltage sensors 120, 121 and 122 in an off condition. The off condition of sensor 121 produces a low signal input to inverter 133 which in turn applies a corresponding high signal input to AND gate 132. With both inputs high, AND gate 132 applies a high signal input to the trigger of relay 91 causing closure thereof. The closure of relay 91 applies operating voltage 16 to the flashing red light units 101 of lamp unit 20. At this point, an event has been initiated. VCR 63 has begun recording the output of camera 62 and flashing red lights 101 have begun operating. In addition, with park/neutral switch 35 inoperative indicating the vehicle is not in either park or neutral positions, relay 50 closes providing operative power for wig/wag signal unit 41 and siren 40. Thus, either wig/wag 41 or siren may be operated using actuating switches (not shown). It will be apparent to those skilled in the art that logic 61 responds similarly to the user's activation of take down switch 72 or amber switch 73 instead of red light switch 71 to cause VCR 63 to begin recording. It will be further apparent to those skilled in the art that AND gate 134 and inverter 135 cooperate in the same manner in response to closure of take down switch 72 and the absence of an output signal from voltage sensor 122 to actuate relay 92 coupling operative power to take down lights 102. By way of further similarity, it will be apparent that the actuation of amber light switch 73 causes AND gate 136 and inverter 137 to respond and activate relay 93 in the absence of an output signal from voltage detector 122 to close relay 93 and apply operative power to amber lights 103.

Thus, the activation of any one or combination of switches 71 through 73 initiates an event and applies power to the appropriate lights within lamp unit 20 as an event is initiated. As described above, auxiliary switches 76 through 79 are coupled to auxiliary relays 96 through 99 to control auxiliary power elements 106 through 109 to add further flexibility to the present invention system. With the vehicle operating in an event mode, the police officer would normally drive some distance and then pull over either having pulled over an errant motorist or arrived at the response scene or similar activity. In such case, the officer would typically place the vehicle in park or neutral activating park/neutral switch 35 and thereafter exit the vehicle. In most instances, police officers leave the various emergency lights of the vehicle operating and leave the engine running and exit the vehicle. Once the officer has exited the vehicle, several important subsystems of the present invention control and interface system come into play. As described above, canine alert system 21 (seen in FIG. 1) monitors the air conditioning temperature within the vehicle and the voltage of the operating power system to assure that the engine continues to run and the air conditioning system continues to operate. This precaution is taken to protect occupants or police dogs within the vehicle interior. As is also described above, should either the engine kill or the air conditioning system fail, canine alert circuit 21 responds producing an output signal applied to transmitter 22 which communicates directly to the police officer. This communication may, for example, comprise a conventional pager or beeper. Another important subsystem of the present invention control and interface system is the power management system indicated by dashed-line box 15. In the event the officer has turned off the vehicle engine leaving the lights operating or in the event the engine kills, the light systems are powered by the vehicle battery. To protect the vehicle battery, the power management system determines the drop in battery voltage as current is drained and responds by systematically reducing the output power drain to avoid complete battery discharge. Thus, as the operating power system of the vehicle becomes discharged, sensor 120 responds to the drop in voltage level before ten and a half volts by producing an output high signal which is applied to the input of inverter 131. A high signal at the input of inverter 131 causes a low signal to be applied to the corresponding input of AND gate 130. In the absence of high signals at both inputs, AND gate 130 turns off despite the activation of rotator switch 70 and no longer applies a high input signal to relay 90. In response, relay 90 opens terminating the operating power coupling to rotators 100. The system is configured to shut off rotators 100 initially in power management activities due to the high current drain which they represent. As the system continues to drain power from the vehicle battery and the voltage of the battery systems drops below ten volts, sensor 121 responds producing a high output signal at the input to inverter 133. The high signal input at inverter 133 causes a low signal at one input of AND gate 132. AND gate 132 as a result no longer produces a high output signal at relay 91 despite the activation of red light switch 71 causing relay 91 to open and terminating power to red lights 101. When the battery system voltage decreases below nine and one-half volts, sensor 122 responds producing high inputs at inverters 135, 137, 139 and 141. The inverters, as a result, couple low input signals to the corresponding inputs of AND gates 134, 136, 138 and 140. As a result, relays 92, 93, 94 and 95 are opened terminating the application of vehicle power to take down lights 102, amber lights 103 and alley lights 104 and 105. Thus, in a completely unattended vehicle which the officer has left operating, the battery power system is protected by the power management system against complete discharge of the vehicle battery by the power management system. This is of particular advantage in that it may be assumed that the officer having left the vehicle is completely occupied with the task at hand and is not likely to recall or be concerned with the operation of the vehicle. It should be noted that the operation of power management system 15 does not interfere with or alter the input signal conditions to OR gate 152 of control logic 61. Thus, despite the operation of the power management system to terminate light operation, VCR 63 continues to be operated by control logic 61 so long as the event continues.

Control logic 61 is configured to initiate operation as the officer commences an event signaled by the actuation of any one of switches 71, 72 or 73 of switch panel array 11. The termination of an event which causes VCR 63 to cease recording is signaled to logic 61 by the sequence of the vehicle being in park/neutral during which time switches 71, 72 and 73 are deactivated followed by the shifting of the vehicle out of park or neutral into a drive gear. Thus, logic 61 is configured to prevent termination of VCR recording by simply turning off switches 71 through 73. More specifically, with an event in progress, OR gate 152 produces a high input which is inverted by inverter 151 producing a low input at AND gate 150. As the vehicle stops during an event and is placed in park or neutral, a high input signal is applied to the remaining input of AND gate 150. AND gate 150 however requires both inputs high to produce a high output signal. Thus, merely stopping and placing the vehicle in park/neutral does not terminate VCR recording. If, however, while in park/neutral the officer turns off switches 71 through 73, the output of OR gate 152 goes low producing a high input signal at the remaining input of AND gate 150. With both inputs high, AND gate 150 produces a high output at stop signal input 154 of VCR control 60 terminating VCR recording. Thus, VCR recording is controlled automatically by control logic 61 and, without attention from the police officer, initiates recording at the beginning of an event and terminates it at its conclusion. This allows the police officer to remain focused on other more important activities.

The actuation of kill switch 80 within panel array 11 inhibits the operation of relays 37 and 38. With relays 37 and 38 open, the coupling between reverse switch 116 and back-up lights 115 as well as the coupling between brake switch 118 and brake light switch 117 is interrupted. This provides officers with the ability to utilize the vehicle in darkened areas without exposure due to back-up light and brake light action. Park/neutral switch 35 also operates relay 50 which is operative to open the power coupling to wig/wag circuit 41 and siren 40. Thus, with the vehicle in park or neutral, these systems are inactivated.

Timer 43 operates the locking mechanism within gun lock 42 to provide an unlocked condition for a predetermined time interval after which the gun lock is again secured. The assumption here is that with ignition switch 34 on and hidden switch 34 actuated, a short time interval is provided for the officer to withdraw the weapon. At the termination of this interval, the weapon is again automatically secured if not removed from the gun lock. This allows the officer to exit the vehicle quickly or abort the withdrawal of the weapon and be confident that the integrity of the gun lock is restored. More specifically, gun lock timer 43 includes a timer 56 operating a relay 55. Relay 55 controls the operation of an electromagnetic locking mechanism (not shown) of conventional fabrication within gun lock 42. Timer 56 is conventional in structure and responds to an input or reset signal by producing an output signal for the timer interval. Timer 43 further includes a jumper 54 for directly coupling the reset input of timer unit 56 to an override switch or gun lock switch 58. In the absence of a jumper 54, timer unit 56 responds solely to the actuation of hidden switch 44 and the simultaneous on condition of ignition 34. This operation is provided by AND gate 57 which produces a timer reset signal each time hidden switch 44 and ignition switch 34 are simultaneously actuated. In response to the output of timer unit 56, relay 55 closes for a predetermined interval which in the present embodiment has been chosen to be approximately eight seconds. During this eight second interval, relay 55 is closed and gun lock 42 is unlocked. Upon the expiration of the timed interval, gun lock 42 is again secured.

The present invention system shown in FIGS. 1 and 2 may be installed within a vehicle during conversion to a police or other emergency vehicle in a variety of installations. However, in accordance with a particular advantage of the present invention system, the operative components of the system are placed for the most part upon a common circuit module and thus may be easily coupled to the vehicle systems using a plurality of convenient plug-in connectors. For purposes of illustration, these connectors are shown in dashed-line representation in FIG. 2 as connectors 81, 119, 47, 110 and 59. Thus, connector 81 groups the switches of switch panel array 11 while connector 119 groups the various switches within the vehicle found within the steering column. Connector 110 groups the operating units of lamp unit 20 which in most instances comprises a light bar together with auxiliary units 106 to 109. The use of such connectors and the grouping of the components of the present invention control and interface system for emergency vehicle in the manner shown provides substantial flexibility and ease of installation and maintenance.

What has been shown is a control and interface system for emergency vehicles which provides ease of installation and maintenance and substantial flexibility of operation. The system includes a power management capability which intervenes with light operation to protect the vehicle battery system from undue discharge. A timed gun lock unit provides security and access to the supplemental weapon such as a shotgun or the like while an automated VCR control logic provides appropriate recording activities during events which are automatically initiated at the start of an event and terminated at its conclusion. The system is easily installed and greatly enhances the maintenance capability of the present invention system. In its preferred form, the system is implemented using relatively simple logic systems and switches together with high reliability relays to avoid undue complexity and potential for system failure. In the configuration shown, the various switches within the switch panel array are anticipated to be manual or touch switches. However, it will be apparent to those skilled in the art that the switch panel array may be replaced or supplemented with a microprocessor based system providing interface to other microprocessor systems for further automation.

It will be apparent to those skilled in the art that the various relays used in the present invention system may employ other switching apparatus without departing from the present invention. Thus, some or all of the relays shown in FIGS. 1 and 2 may, for example, be replaced by power transistor switches or the like.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a motor vehicle having an interior, an ignition switch, a plurality of supplemental lights for use by police or emergency personnel and a source of vehicle electrical power source, a control and interface system comprising:

a first connector set;

a switch array having a plurality of user-operable switches supported on a common panel within said interior;

a plurality of relays supported upon a common relay module each relay being coupled to said supplemental lights through said first connector set and each relay being operable to couple selected groups of said supplemental lights to said source of vehicle electrical power;

a second connector set coupling said switch array to said relay module; and power management means for detecting the decrease of output voltage of said source of vehicle electrical power and sequentially terminating the coupling of selected ones of said relays at sequentially lower output voltages, said first and second connector sets providing for easy conversion of said motor vehicle to an emergency vehicle by facilitating plug-in installation of said switch array and said relay module.

2. A control and interface system as set forth in claim 1 wherein said motor vehicle includes an air conditioner and further including an alert system having:

a temperature sensor;

an alert sensor coupled to said source of vehicle electrical power and said temperature sensor for producing an alert signal in the event said source of vehicle electrical power output voltage drops or said temperature sensor senses temperature exceeding a predetermined temperature; and an alert means responsive to said alert signal for communicating an alert condition to a remote user.

3. A control and interface system as set forth in claim 2 wherein said motor vehicle includes a park/neutral switch, a video recorder and a video camera and wherein said control and interface system further includes:

a video recorder control operatively coupled to said video recorder and said video camera and having a record input and a stop input; and a control logic coupled to selected ones of said user-operable switches and said park/neutral switch and having means for producing an activating signal at said record input in response to actuation of any one of said selected user-operable switches and means for producing a stop signal at said stop input once said record input has been produced and said park/neutral switch is actuated.

4. A control and interface system as set forth in claim 3 wherein said motor vehicle includes a gun receptacle having means for securing a weapon therein and for releasing said weapon in response to an unlock signal and wherein said control and interface system further includes:

a relay coupled to said gun receptacle for applying said unlock signal thereto;

a hidden switch within said motor vehicle;

a timer having a reset input and operating said relay for a predetermined interval in response to a reset input signal; and AND gate means having an output coupled to said timer to provide said reset input signal and a pair of inputs coupled to said ignition switch and said hidden switch, said AND gate applying said reset input signal to said reset input in response to simultaneous activation of said ignition switch and said hidden switch.

5. A control and interface system as set forth in claim 1 wherein said motor vehicle includes a park/neutral switch, a video recorder and a video camera and wherein said control and interface system further includes:

a video recorder control operatively coupled to said video recorder and said video camera and having a record input and a stop input; and a control logic coupled to selected ones of said user-operable switches and said park/neutral switch and having means for producing an activating signal at said record input in response to actuation of any one of said selected user-operable switches and means for producing a stop signal at said stop input once said record input has been produced and said park/neutral switch is actuated.

6. A control and interface system as set forth in claim 1 wherein said motor vehicle includes a gun receptacle having means for securing a weapon therein and for releasing said weapon in response to an unlock signal and wherein said control and interface system further includes:

a relay coupled to said gun receptacle for applying said unlock signal thereto;

a hidden switch within said motor vehicle;

a timer having a reset input and operating said relay for a predetermined interval in response to a reset input signal; and AND gate means having an output coupled to said timer to provide said reset input signal and a pair of inputs coupled to said ignition switch and said hidden switch, said AND gate applying said reset input signal to said reset input in response to simultaneous activation of said ignition switch and said hidden switch.

7. For use in converting a motor vehicle having an interior, an ignition switch, an engine, an electrical power source, a park/neutral switch, and an air conditioning system to an emergency vehicle having a plurality of supplemental lights, a control and interface system comprising:

first and second connector sets;

a switch array having a plurality of user operated switches and a supporting switch panel within said interior;

a plurality of power couplers coupled to said switch array through said first connector set and each coupled to said electrical power source and each operatively coupling said electrical power source to said supplemental lights in response to said plurality of user operated switches through said second connector set; and power management means having means for sensing the output level of said electrical power source and sequentially interrupting the power coupling of said power couplers as the output level of said electrical power source decreases below a predetermined sequence of voltages, said first and second connector sets cooperating to facilitate conversion of said motor vehicle to an emergency vehicle by providing plug-in installation of said switch array and said plurality of power couplers within said vehicle.

8. A control and interface system as set forth in claim 7 wherein said power couplers are relays.

9. A control and interface system as set forth in claim 7 further including alert means for producing an alert signal to a user in the event said engine ceases operation or said air conditioning system fails.

10. A control and interface system as set forth in claim 7 further including a video camera and video recorder coupled thereto and means for causing said video recorder to record in response to activation of a selected one of said plurality of user operated switches and means for maintaining recording until said selected plurality of user operated switches are deactivated and said park/neutral switch is switched between active and inactive status.

11. A control and interface system as set forth in claim 7 wherein said motor vehicle includes brake lights, back-up lights, a brake light switch and a back-up switch and wherein said control and interface system includes:

a kill switch within said switch array;

a first coupler interposed between said brake lights and said brake light switch; and a second coupler interposed between said back-up lights and said back-up light switch, said kill switch causing said first and second couplers to open in response to kill switch activation.

12. A control and interface system as set forth in claim 7 wherein said power management means includes a plurality of voltage level sensors each responding to sequentially lower voltage thresholds.

* * * * *